United States Patent
Minamikawa

(10) Patent No.: US 11,947,848 B2
(45) Date of Patent: Apr. 2, 2024

(54) IMAGE PROCESSING SYSTEM AND NON-TRANSITORY COMPUTER READABLE MEDIUM STORING PROGRAM

(71) Applicant: FUJIFILM Business Innovation Corp., Tokyo (JP)

(72) Inventor: Takahiro Minamikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 353 days.

(21) Appl. No.: 17/329,168

(22) Filed: May 25, 2021

(65) Prior Publication Data
US 2022/0179601 A1 Jun. 9, 2022

(30) Foreign Application Priority Data

Dec. 4, 2020 (JP) .................................. 2020-202013

(51) Int. Cl.
*G06F 3/12* (2006.01)

(52) U.S. Cl.
CPC .......... *G06F 3/1236* (2013.01); *G06F 3/1205* (2013.01); *G06F 3/1284* (2013.01); *G06F 3/1204* (2013.01)

(58) Field of Classification Search
None
See application file for complete search history.

(56) References Cited

U.S. PATENT DOCUMENTS

| 9,531,893 | B2 * | 12/2016 | Ishino ................ H04N 1/00411 |
| 10,001,954 | B2 * | 6/2018 | Minagawa ............ G06F 3/1228 |
| 2003/0172145 | A1 * | 9/2003 | Nguyen ................ H04L 12/185 |
| | | | 709/223 |

FOREIGN PATENT DOCUMENTS

| JP | 2011040900 | 2/2011 |
| JP | 2015099552 | 5/2015 |
| JP | 2016144152 | 8/2016 |
| JP | 2020048092 | 3/2020 |

* cited by examiner

Primary Examiner — Darryl V Dottin
(74) Attorney, Agent, or Firm — JCIPRNET

(57) ABSTRACT

An image processing system includes a first processor that is mounted on an image processing apparatus installed in a shared space and shared by plural users who do not belong to an identical organization, and a second processor that is mounted on a control apparatus installed together with a virtual private network (VPN) connection unit in a local area network outside the shared space, the control apparatus being used by an organization to which a part of the plural users belongs, in which the first processor is configured to acquire address information of the VPN connection unit, the first processor is connected to the VPN connection unit by using the acquired address information, and the second processor is configured to acquire apparatus information indicating an apparatus configuration of the image processing apparatus from the image processing apparatus via the VPN connection unit, acquire contract information regarding use of the image processing apparatus corresponding to the organization to which the user who uses the image processing apparatus belongs, and execute processing corresponding to the apparatus information and the contract information to control image processing performed by the first processor.

14 Claims, 12 Drawing Sheets

FIG. 2

USER MANAGEMENT INFORMATION

| ORGANIZATION ID | AUTHENTICATION INFORMATION | | CONNECTION INFORMATION | | CONTROL APPARATUS ADDRESS | CONTRACT INFORMATION |
|---|---|---|---|---|---|---|
| | USER ID | PASSWORD | VPN ROUTER ADDRESS | AUTHENTICATION DATA | | |
| K001 | U00101 | pwd01 | 123.456.789.012 | | 123.456.789.001 | ONLY MONOCHRONIC PRINTING PERMITTED |
| | U00102 | pwd02 | | | | |
| K002 | U00201 | pwd03 | 123.456.789.123 | | 123.456.789.100 | |
| . . . | | | | | | |

IMAGE PROCESSING SYSTEM AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-202013 filed Dec. 4, 2020.

BACKGROUND

(i) Technical Field

The present invention relates to an image processing system and a non-transitory computer readable medium storing a program.

(ii) Related Art

JP2020-048092A proposes a technology for separating an image processing apparatus in a local network and a control apparatus outside the local network and performing image processing performed by the image processing apparatus on the control apparatus side according to hardware specifications of the image processing apparatus and contract services. In a case where the control apparatus of a certain organization controls a plurality of image processing apparatuses to perform similar image processing by using this technology, a user belonging to the organization can use the image processing apparatuses with identical usability even in any of local networks in which the image processing apparatuses are installed.

Incidentally, in recent years, as work-style reforming and remote working have become more widespread, workplaces used by cross-company workers in coworking spaces and shared offices, freelancers, and students have been expanding. A manager of the workplace installs an image processing apparatus in the workplace, and provides services to users of the workplace.

SUMMARY

In a case where the image processing apparatus installed in a shared space is shared by a plurality of users who do not belong to an identical organization, there may be a security problem, but the use of the image processing apparatus installed in the shared space is not mentioned in JP2020-048092A.

Other examples of related art include JP2011-040900A, JP2015-099552A, and JP2016-144152A.

Aspects of non-limiting embodiments of the present disclosure relate to an image processing system and a non-transitory computer readable medium storing a program that can control image processing performed by an image processing apparatus installed in a shared space and used by a plurality of users who do not belong to an identical organization from outside a shared environment.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing system including a first processor that is mounted on an image processing apparatus installed in a shared space and shared by a plurality of users who do not belong to an identical organization, and a second processor that is mounted on a control apparatus installed together with a virtual private network (VPN) connection unit in a local area network outside the shared space. The control apparatus is used by an organization to which a part of the plurality of users belongs. The first processor is configured to acquire address information of the VPN connection unit, the first processor is connected to the VPN connection unit by using the acquired address information, and the second processor is configured to acquire apparatus information indicating an apparatus configuration of the image processing apparatus from the image processing apparatus via the VPN connection unit, acquire contract information regarding use of the image processing apparatus corresponding to the organization to which the user who uses the image processing apparatus belongs, and execute processing corresponding to the apparatus information and the contract information to control image processing performed by the first processor.

BRIEF DESCRIPTION OF THE DRAWINGS

Exemplary embodiment(s) of the present invention will be described in detail based on the following figures, wherein:

FIG. 2 is a diagram showing an example of a data configuration of user management information stored in a user management information storage unit in the first exemplary embodiment;

DETAILED DESCRIPTION

Hereinafter, exemplary embodiments of the present invention will be described with reference to the drawings.

First Exemplary Embodiment

Figure 1:
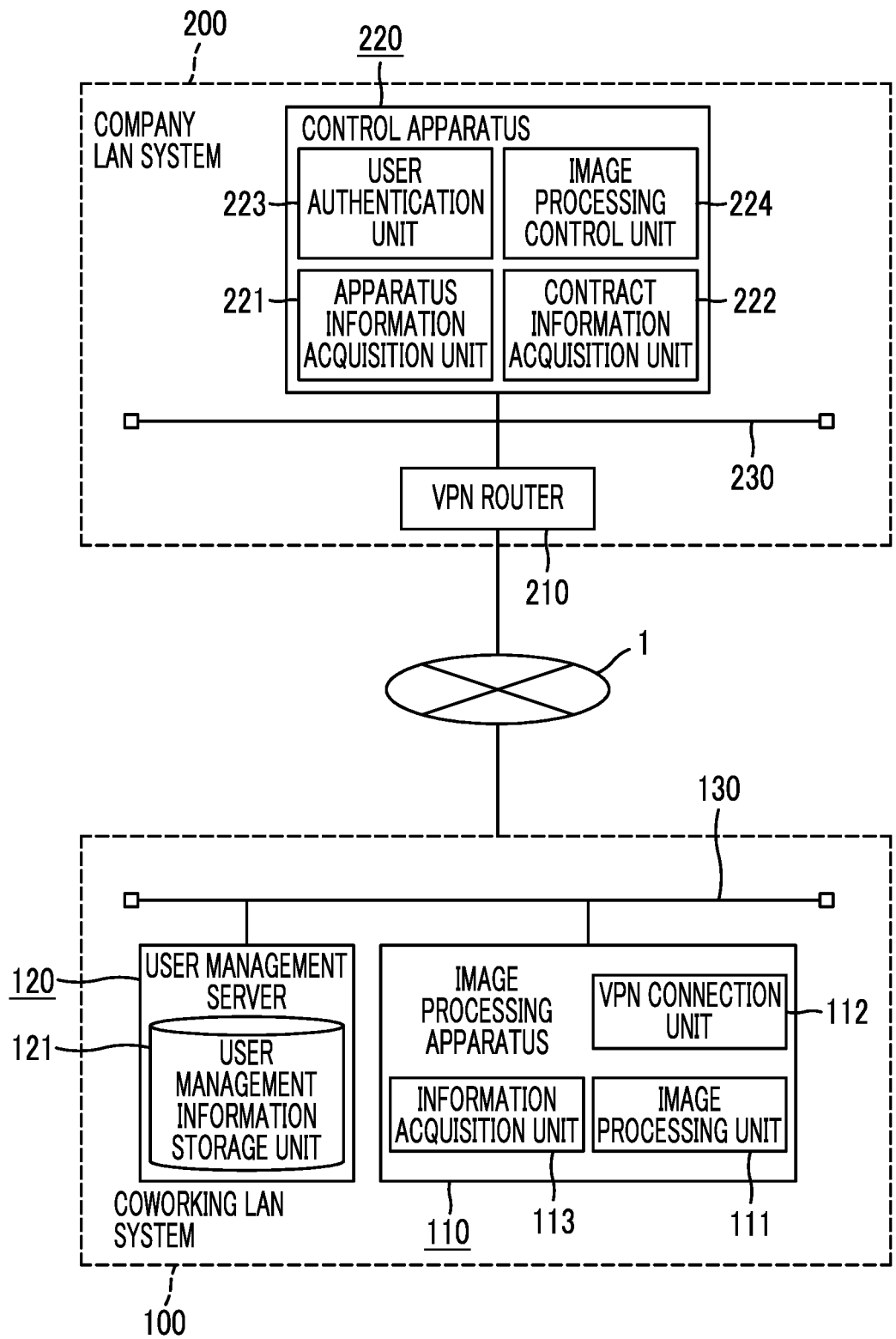
FIG. 1 is a block configuration diagram showing an image processing system according to a first exemplary embodiment.

FIG. 1 is a block configuration diagram showing an image processing system according to an exemplary embodiment of the present invention. FIG. 1 shows a configuration in which a coworking local area network (LAN) system 100 and a company LAN system 200 are connected via a network 1 configured as the Internet or the like. The image processing system according to the present exemplary embodiment can be achieved by combining, as hardware, traditional computers, and the like, and characteristic image processing in the present exemplary embodiment is controlled by software operating on each computer as will be described later.

The coworking LAN system 100 is a LAN system installed in a coworking space. In the present exemplary embodiment, a "shared space" is a space in which there are a plurality of users who do not belong to an identical organization, such as a coworking space or a shared office. The plurality of users who do not belong to the identical organization share an image processing apparatus installed in the shared space. In the present exemplary embodiment, the coworking space will be described as an example of the shared space.

The "organization" refers to a group configured to achieve a particular purpose. In a case where users who do not belong to any organization use the coworking space, the coworking space can be a space shared by the plurality of users who do not belong to the identical organization rather than a plurality of users who belong to different organizations. In the present exemplary embodiment, for the sake of convenience in description, it is assumed that the users of the coworking space belong to any organization. In the present exemplary embodiment, a company will be described as an example of the organization. Accordingly, in the following description, the "organization" and the "company" are used synonymously. As the organization, there are educational institutions such as universities.

The company LAN system 200 is a LAN system installed in the company. As described above, the "company" is an example of an organization to which a part of a plurality of users who use the coworking space belongs. The part of the plurality of users refers to one or a plurality of users and users who belong to the identical organization. Since the coworking LAN system 100 is used by users belonging to each of a plurality of companies, the company LAN system 200 is constructed for each company to which each user belongs and is connected to the network 1. Since the company LAN system 200 of each company has the configuration shown in FIG. 1 and controls image processing to be described later, only the company LAN system 200 of one company is shown in FIG. 1.

The coworking LAN system 100 in the present exemplary embodiment is configured such that an image processing apparatus 110 and a user management server 120 are connected to each other via a LAN 130.

The image processing apparatus 110 is installed in the coworking space and is used only by the users of the coworking space. More specifically, the image processing apparatus 110 is available to users belonging to organizations that sign a contract with a manager of the coworking space. The image processing apparatus 110 is shared by the users who belong to each of the plurality of organizations, in other words, the plurality of users who do not belong to the identical organization.

The image processing apparatus 110 is also called an image forming apparatus, is a multifunction device having various image processing functions such as a printer function, a copier function, and a scanner function, and is a device having a built-in computer. The image processing apparatus 110 includes a CPU as a first processor, a ROM, a RAM, an HDD, a scanner as an image scanning device that scans an image on a medium such as a sheet, a print engine as an image forming device that forms an image on a medium, an operation panel that receives instructions from users and displays information, and a network interface that connects communication lines such as the network 1 and the LAN 130 to each other. The image processing apparatus 110 may include an external medium interface for connection with an external memory device such as a USB memory or a flash memory, and a wireless communication unit that performs short-range wireless communication with a mobile terminal.

In the present exemplary embodiment, the "image processing" includes not only processing such as forming and scanning directly performed on an image, but also pre-processing of performing image processing such as forming and reading of an image in a broader sense (for example, processing of acquiring an image and the like) and post-processing (for example, processing of saving an image or the like).

The image processing apparatus 110 includes an image processing unit 111, a VPN connection unit 112, and an information acquisition unit 113. The image processing unit 111 executes image processing according to control by a control apparatus 220 based on apparatus information and contract information in response to a request from the user. The image processing unit 111 provides various image processing functions according to the hardware and the software included in the image processing apparatus 110. However, each user who is permitted to use the coworking space may not be able to use all the functions provided by the image processing apparatus 110, and can use the functions within a range specified in the contract information regarding the use of the coworking space.

The VPN connection unit 112 acquires address information (for example, IP address) of a VPN router 210 installed in the company LAN system 200 of the company to which the user belongs in response to a request from the user, and performs VPN connection with the company LAN system 200 to which the user belongs. In the present exemplary embodiment, the "VPN connection" refers to connection between two parties, that is, between the coworking LAN system 100 and the company LAN system 200 so as to be able to communicate by VPN in the case of the present exemplary embodiment. The VPN connection unit 112 disconnects the VPN connected in response to a release request. The information acquisition unit 113 acquires information necessary for controlling the VPN connection and the image processing as will be described in detail later.

Each of the components 111 to 113 in the image processing apparatus 110 is achieved by a cooperative operation of a computer mounted on the image processing apparatus 110 and a program operating on a CPU mounted on the computer.

The user management server 120 is a server used for managing users who are permitted to use the coworking space by contract. The user management server 120 has a user management information storage unit 121. The user management information storage unit 121 may be achieved by the HDD mounted on the image processing apparatus 110.

FIG. 2 is a diagram showing an example of a data configuration of user management information stored in the user management information storage unit 121 in the present exemplary embodiment. The user management information in the present exemplary embodiment includes an organization ID, authentication information, connection information, control apparatus address, and contract information. The organization ID is identification information of the organization that signs a contract with the manager of the coworking space. The authentication information is information necessary, when the image processing apparatus 110 is used in the organization, that is, information necessary, when the user logs in to the image processing apparatus 110, and is set for each individual who uses the image processing apparatus 110. The user management server 120 in the present exemplary embodiment has a function of an authentication server by retaining and managing the authentication information. The connection information includes information necessary for connection with the company LAN system 200. As a VPN router address included in the connection information, the IP address of the VPN router installed in the company LAN system 200 of the organization is set as the address information. Authentication data necessary for establishing connection with the VPN router is set as authentication data. The authentication data is defined by a policy of the VPN router, such as a user certificate and a passcode. At least the address information of the VPN router may be included in the connection information. The IP address of the control apparatus 220 is set as the control apparatus address. The contract information is information regarding the contract signed between the manager of the coworking space and the company. The contract information includes service information indicating contents of services available to the users of the organization. For example, even though the image processing apparatus 110 has functions of color printing and monochrome printing as a color mode, a user belonging to a company permitted to use only the monochrome printing by contract is permitted to use only the monochrome printing.

The company LAN system 200 is configured such that the VPN router 210 and the control apparatus 220 are connected via the LAN 230.

The VPN router 210 performs the VPN connection with an external network system, that is, the coworking LAN system 100 in the case of the present exemplary embodiment. The VPN router 210 in the present exemplary embodiment relays data exchanged between the image processing apparatus 110 included in the coworking LAN system 100 connected via the VPN and the control apparatus 220.

The control apparatus 220 controls the image processing executed by the image processing apparatus 110. The control apparatus 220 can be achieved by a general-purpose hardware configuration such as a traditional personal computer (PC). That is, the image processing apparatus 110 includes a CPU as a second processor, a ROM, a RAM, an HDD, a user interface such as an operation panel that receives instructions from users and displays information, and a network interface that connects communication lines such as the network 1 and the LAN 230 to each other.

The control apparatus 220 includes an apparatus information acquisition unit 221, a contract information acquisition unit 222, a user authentication unit 223, and an image processing control unit 224. The apparatus information acquisition unit 221 acquires apparatus information indicating an apparatus configuration of the image processing apparatus 110 from the image processing apparatus 110 via the VPN router 210. The apparatus information is information indicating the apparatus configuration of the image processing apparatus 110. The apparatus information may include, for example, specification information indicating a hardware configuration or a software configuration included in the image processing apparatus 110, or the apparatus information may include ability information indicating ability of a service or a function achieved by the hardware configuration or the software configuration included in the image processing apparatus 110.

The contract information acquisition unit 222 acquires the contract information regarding the use of the image processing apparatus 110 of the organization ("company" in the present exemplary embodiment). The contract information acquisition unit 222 in the present exemplary embodiment acquires the contract information acquired by the image processing apparatus 110 from the image processing apparatus 110 via the VPN router 210.

The user authentication unit 223 authenticates the user belonging to the company using the image processing apparatus 110. The image processing control unit 224 controls the execution of the image processing in the image processing apparatus 110 according to the apparatus information and the contract information.

Each of the components 221 to 224 in the control apparatus 220 is achieved by a cooperative operation of a computer forming the control apparatus 220 and a program operated by a CPU mounted on the computer.

The programs used in the present exemplary embodiment can be provided not only by a communication unit but also while being stored in a computer-readable recording medium such as a CD-ROM or a USB memory. The programs provided by the communication unit and the recording medium are installed on the computer, and various pieces of processing are achieved by sequentially executing the programs by the CPU of the computer.

Next, an operation in the present exemplary embodiment will be described. First, in the present exemplary embodiment, schematic pieces of processing of controlling the image processing in the image processing apparatus 110 by the control apparatus 220 will be described with reference to a flowchart shown in FIG. 3. The details of the processing will be described later.

In a case where the user in the coworking space wants to start using the image processing apparatus 110, the user inputs the authentication information to the image processing apparatus 110. The image processing apparatus 110 performs user authentication based on the input authentication information while referring to the user management information (step S110). The user authentication performed herein is positioning as authentication for specifying the VPN router 210 as a VPN connection destination rather than user authentication for using the image processing apparatus 110. Here, the description will be continued on the assumption that the authentication has succeeded.

Subsequently, the information acquisition unit 113 in the image processing apparatus 110 acquires the connection information corresponding to the organization to which the user who has succeeded in the authentication belongs while referring to the user management information (step S120). More specifically, the IP address of the VPN router 210 installed in the company LAN system 200 of the company to which the user who logs in to the image processing apparatus 110 and starts using the image processing apparatus belongs is acquired. In the present exemplary embodiment, the connection information including the VPN router address is registered and set in advance in the user management server 120 included in the coworking LAN system 100, and the information acquisition unit 113 acquires the connection information from the user management server 120.

Subsequently, the VPN connection unit 112 establishes the VPN connection between the image processing apparatus 110 and the VPN router 210 by using the acquired connection information (step S130). A procedure of the VPN connection may be identical to the traditional connection procedure.

By the above pieces of processing (steps S110 to S130), the image processing apparatus 110 installed in the coworking space and the control apparatus 220 that controls the image processing in the image processing apparatus 110 from the outside can securely perform data communication via the VPN.

Subsequently, the control apparatus 220 controls the image processing in the image processing apparatus 110 as follows.

First, in the control apparatus 220, the apparatus information acquisition unit 221 acquires the apparatus information from the image processing apparatus 110, and the contract information acquisition unit 222 acquires the contract information (step S140). The details of the processing related to the acquisition of the contract information will be described later.

The image processing control unit 224 activates the image processing function in the image processing apparatus 110 according to the acquired apparatus information and contract information (step S150). The image processing control unit 224 controls the image processing apparatus 110 to perform the image processing within a range of the activated function. In other words, the image processing unit 111 in the image processing apparatus 110 executes the image processing in response to an instruction from the user (step S160), but the execution of the image processing is executed under the control of the image processing control unit 224. The image processing is continued until the user instructs the end of the image processing (N in step S170), and the processing is ended in a case where the user instructs the end of the image processing (Y in step S170).

Hereinafter, the details of the pieces of processing (steps S140 to S170) executed after the VPN connection will be described.

Although not shown in FIG. 1, a program management server is provided on the cloud. The program management server manages a plurality of image processing programs. Each image processing program is associated with identification information (for example, a user ID) of a user who can use the program.

In a case where the authentication information is acquired from the image processing apparatus 110, the program management server replies an access path (for example, a URL, an IP address, a port number, or the like) to the image processing program corresponding to the user ID included in the authentication information to the image processing apparatus 110.

The authentication information used herein is authentication information for logging in to and using the image processing apparatus 110. The authentication information used in step S110 is authentication information used for selecting a correct VPN connection destination. In the present exemplary embodiment, the authentication information managed by the user management server 120 is used in common for the sake of convenience, but it is not necessary to use the identical authentication information for performing the VPN connection and logging in to the image processing apparatus 110.

The image processing apparatus 110 transmits, to the control apparatus 220, a connection request with the image processing program by using the user ID and the access path acquired from the program management server. For example, Hypertext Transfer Protocol Security (HTTPS) may be used for the connection request from the image processing apparatus 110 to the control apparatus 220.

In a case where the connection request with the image processing program is received from the image processing apparatus 110, the control apparatus 220 performs the user authentication, and in a case where the authentication has succeeded, information indicating the connection success is replied, as a response to the connection request, to the image processing apparatus 110 from the control apparatus 220. More specifically, in a case where an access key acquired as a usage reservation from the program management server by using the acquired access path and an access key included in the connection request received from the image processing apparatus 110 match, the control apparatus 220 replies the information indicating the connection success to the image processing apparatus 110.

In a case where the information on the connection success is replied, the image processing apparatus 110 transmits, to the control apparatus 220 that executes the image processing program, the apparatus information indicating the apparatus configuration of the image processing apparatus 110, which is executed in step S140.

The image processing control unit 224 in the control apparatus 220 controls the execution of the image processing in the image processing apparatus 110 by controlling a device such as a print engine or a scanner included in the image processing apparatus 110 according to the image processing program managed by the program management server as described above.

That is, the image processing control unit 224 in the control apparatus 220 determines a function or a service to be provided to the image processing apparatus 110 based on the apparatus information and the contract information and provides image data of a user interface image corresponding to the function or the service to be provided to the image processing apparatus 110 by executing the connected image processing program. The image processing control unit 224 limits the operation by the image processing apparatus 110 according to the function or the service to be provided.

For example, in a case where it is found that the image processing apparatus 110 has both a monochrome printing function and a color printing function by referring to the apparatus information, the image processing control unit 224 controls the execution of the monochrome printing or the color printing in response to a user operation by providing a user interface image including an operation button of the monochrome printing and an operation button of the color printing to the image processing apparatus 110.

For example, even though the image processing apparatus 110 has both the monochrome printing function and the color printing function, in a case where it is found that the user contracts only a monochrome printing service and does not contract a color printing service by referring to the contract information, the control may be performed such that the execution of the color printing is limited (prohibited) by providing, to the image processing apparatus 110, a user interface image for activating the operation button of the monochrome printing and deactivating the operation button of the color printing. In order to deactivate the operation button of the color printing, for example, a method for hiding the operation buttons or dimming a display color to indicate non-selectable may be used.

In a case where the user interface image is provided, the image processing unit 111 in the image processing apparatus 110 displays the user interface image on a display device such as a touch panel.

For example, processing corresponding to the operation from the user obtained via the user interface image is executed.

In a case where there is the user operation, the image processing unit 111 transmits operation information on the user operation to the control apparatus 220. Examples of the operation information include touch information indicating a type of an operation on the touch panel (for example, touch operation or release operation) and coordinate information indicating a position on the touch panel on which the operation corresponding to the touch information is performed. For example, the image processing unit 111 transmits, as an HTTP request, the operation information to the control apparatus 220.

In a case where the operation information is received, the image processing control unit 224 in the control apparatus 220 controls the image processing in the image processing apparatus 110 by executing the processing corresponding to the operation information. For example, the image processing control unit 224 updates the user interface image as necessary according to the operation information obtained from the image processing apparatus 110, and provides the updated user interface image to the image processing apparatus 110. For example, in a case where a plurality of pieces of operation information are continuously obtained, the image processing control unit 224 may omit a part of the update related to the user interface image and reduce a load of drawing processing.

Figure 3:
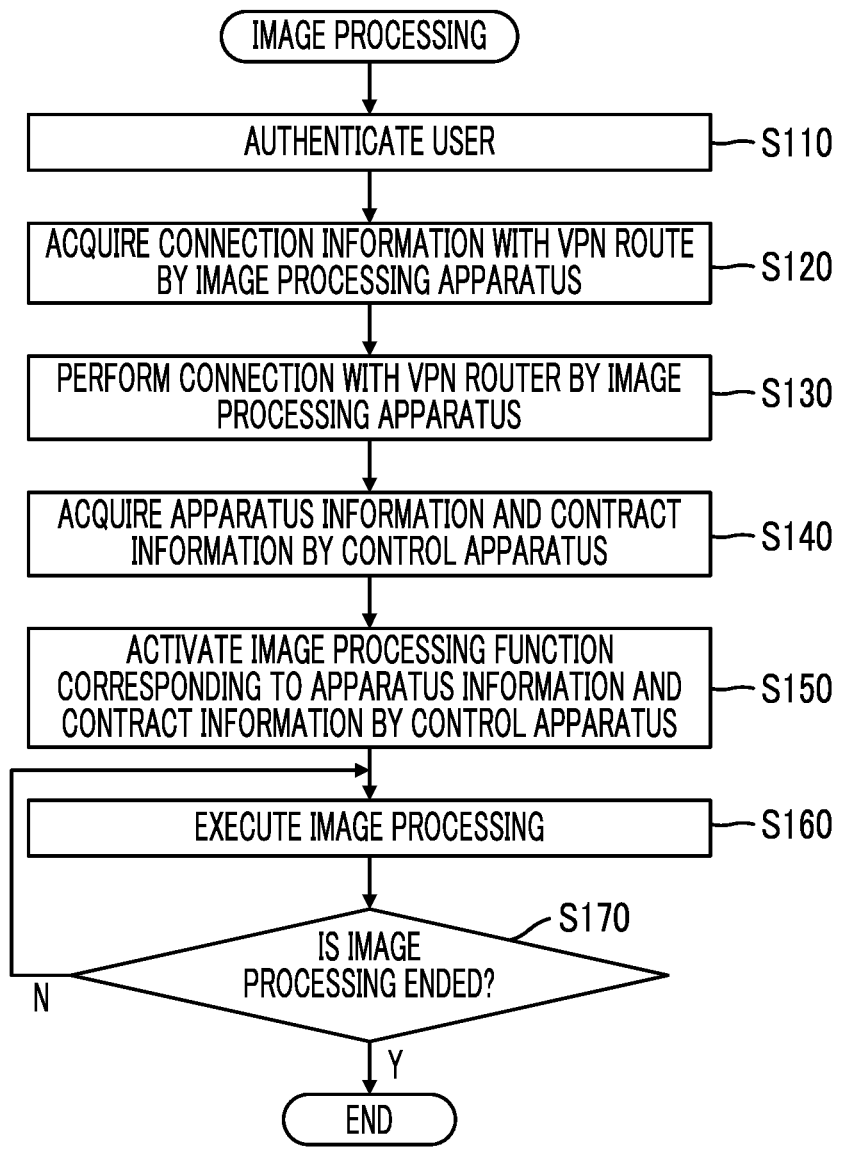
FIG. 3 is a flowchart showing schematic pieces of processing of image processing control in the first exemplary embodiment.

In a case where the user performs an operation of disconnecting the image processing program after ending intended image processing, the image processing apparatus 110 disconnects the connected image processing program. Accordingly, the image processing shown in FIG. 3 is ended.

An outline of processing of controlling the execution of the image processing by connecting the image processing apparatus 110 and the control apparatus 220 via the VPN has been described above. Subsequently, the details of the pieces of processing performed at the time of the VPN connection in the present exemplary embodiment will be described with reference to a sequence diagram shown in FIG. 4. Pieces of processing shown in FIG. 4 correspond to the details of the pieces of processing of steps S110 to S130 of the flowchart shown in FIG. 3. As will be clear from the description of the exemplary embodiments, the detailed order of the pieces of processing shown in the sequence diagram may not match a schematic order of the pieces of processing shown in steps S110 to S130 in some exemplary embodiments.

In a case where the user in the coworking space wants to start using the image processing apparatus 110, the user inputs, as the authentication information, a user ID and a password from a predetermined screen displayed by operating the operation panel of the image processing apparatus 110. The image processing apparatus 110 performs the user authentication by collating a set of the input user ID and password with the authentication information registered in the user management information (step S111). Here, the description will be continued on the assumption that the authentication has succeeded.

Subsequently, the information acquisition unit 113 transmits, to the user management server 120, an address acquisition request including the user ID that has succeeded in the authentication (step S121). The user management server 120 reads out and replies the connection information corresponding to the user ID included in the address acquisition request from the user management information in response to the transmitted address acquisition request (step S122). As described above, in the present exemplary embodiment, processing is performed such that the connection information is registered in the user management server 120 in advance and is acquired from the user management server 120 at the time of the VPN connection.

In a case where the information acquisition unit 113 acquires the connection information as described above, the VPN connection unit 112 transmits a VPN connection request including the authentication data included in the connection information to the VPN router 210 specified by the IP address included in the acquired connection information (step S131).

In a case where the VPN connection request is transmitted from the image processing apparatus 110, the VPN router 210 performs authentication for performing the VPN connection based on the authentication data (step S132). In a case where the authentication has succeeded, the VPN router 210 replies the authentication success. Accordingly, the image processing apparatus 110 establishes the VPN connection with the VPN router 210 (step S133).

Subsequently, the pieces of processing performed at the time of the image processing control after the VPN connection will be described with reference to a sequence diagram shown in FIG. 5. Pieces of processing shown in FIG. 5 correspond to the details of the pieces of processing of steps S140 to S170 of the flowchart shown in FIG. 3.

In the image processing apparatus 110, the information acquisition unit 113 transmits, to the user management server 120, an organization information acquisition request including the user ID that has succeeded in the authentication (step S141). The user management server 120 reads out and replies the control apparatus address and the contract information corresponding to the user ID included in the organization information acquisition request from the user management information in response to the transmitted organization information acquisition request (step S142).

Subsequently, the image processing apparatus 110 transmits, to the control apparatus 220, the connection request with the image processing program including the user ID as described above in order to perform the connection with the image processing program which is executed to receive the image processing control by the control apparatus 220 (step S143). The control apparatus 220 as a transmission destination can be specified by the control apparatus address acquired in step S142. Since the pieces of processing related to the connection with the image processing program have already been described above, the description herein will be omitted.

In a case where the user authentication has succeeded and the connection with the image processing program has succeeded, the image processing apparatus 110 transmits, to the control apparatus 220, the apparatus information of the image processing apparatus retained therein and the contract information acquired in step S142 (step S144).

In the control apparatus 220, in a case where the apparatus information acquisition unit 221 acquires the apparatus information transmitted from the image processing apparatus 110 via the VPN router 210 and the contract information acquisition unit 222 acquires the contract information, the image processing control unit 224 activates the image processing function specialized for the user who has logged in to the image processing apparatus 110 according to the apparatus information and the contract information (step S151). Thereafter, the image processing unit 111 performs the image processing in response to the user operation (step S161), and the image processing control unit 224 controls the image processing performed by the image processing unit 111 in response to the user operation according to the apparatus information and the contract information (step S162). Since the content of the image processing control has already been described above, the description herein will be omitted. In a case where the image processing is ended, the image processing apparatus 110 disconnects the connected image processing program (step S163).

According to the present exemplary embodiment, secure communication may be ensured by performing the VPN connection with the company LAN system 200 of the company to which the user who logs in and uses the image processing apparatus 110 belongs as described above. In a case where the control apparatus 220 included in the company LAN system 200 of the company to which the user belongs controls the image processing in the image processing apparatus 110, since the apparatus information and the contract information managed on the coworking LAN system 100 side are acquired from the coworking LAN system 100, the user may use the image processing apparatus 110 in the range corresponding to the specifications of the image processing apparatus 110 and the contract information of the company to which the user who uses the image processing apparatus 110 belongs.

Incidentally, the disconnection of the VPN not mentioned in the above description will be described herein. The VPN may be disconnected at any of the timings described below.

For example, the VPN is disconnected and information regarding the VPN connection is deleted from the image processing apparatus 110 at a timing at which the user logs out from the image processing apparatus 110. In this case, since the VPN is disconnected and the information regarding the VPN connection is discarded at a timing at which it is not necessary to access the control apparatus 220 of the company LAN system 200, safety is ensured in terms of security.

The information regarding the VPN connection may be retained for a specified fixed time. The information regarding the so-called VPN connection is cached. That is, the image processing apparatus 110 temporarily retains the information regarding the VPN connection for a period in which a certain time has not elapsed after logging out. In a case where the logged-out user logs in again before a certain time has elapsed, the VPN connection is performed by utilizing the temporarily retained information. Accordingly, processing of acquiring the address of the VPN router 210 can be omitted.

Alternatively, in the case of the coworking space that manages times at which each user enters and leaves, the information regarding the VPN connection may be discarded from the image processing apparatus 110 at a timing at which the user who uses the image processing apparatus 110 leaves the coworking space. Accordingly, the processing of acquiring the address of the VPN router 210 can be omitted whenever the image processing apparatus 110 is used until the user leaves.

It is assumed that a start point in time of the certain time is a point in time at which the user logs out, but the present invention is not limited thereto, and may be, for example, a point in time at which the user logs in immediately before or a point in time at which the image processing is ended.

Second Exemplary Embodiment

Figure 6:
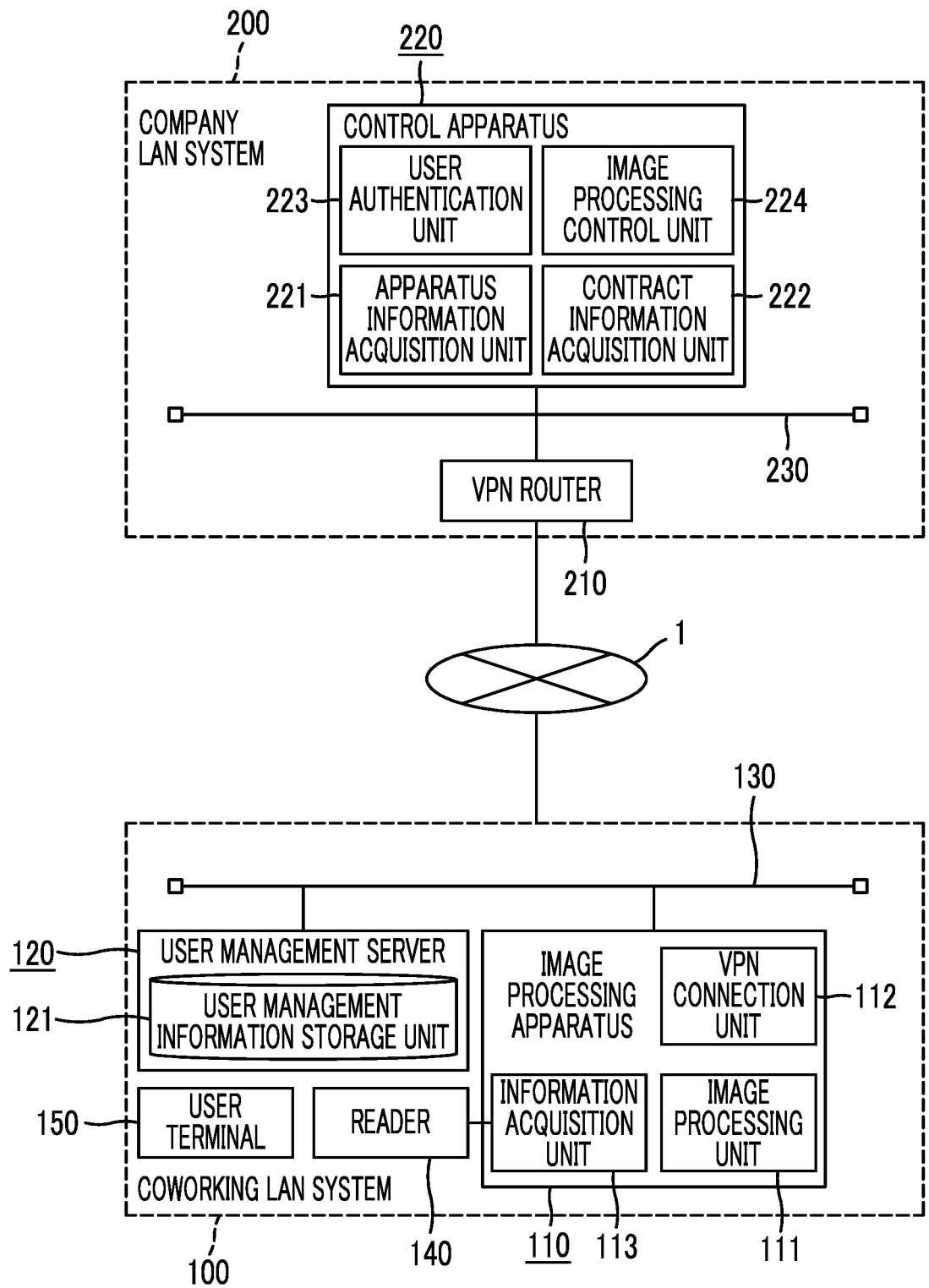
FIG. 6 is a block configuration diagram showing an image processing system according to a second exemplary embodiment.

FIG. 6 is a block configuration diagram showing an image processing system according to the present exemplary embodiment. Components identical to the components of the image processing system according to the first exemplary embodiment are designated by identical reference numerals, and the description thereof will be omitted. The image processing system according to the present exemplary embodiment has a configuration in which a reader 140 is connected to the image processing apparatus 110 shown in the first exemplary embodiment. FIG. 6 shows a portable user terminal 150 of the user who uses the coworking space. The reader 140 has a short-range wireless communication function based on near field communication (NFC), and functions as a data scanning unit that scans information stored in the adjacent user terminal 150. The short-range wireless communication function is not limited to the NFC, and may be achieved by other communication standards such as Bluetooth (registered trademark) and Wi-Fi (registered trademark). Contact-type wireless communication or wired communication may be adopted. In a case where the reader 140 is provided in the image processing apparatus 110, the existing reader 140 may be used.

The connection information described in the first exemplary embodiment is registered in the user terminal 150. Thus, it is not necessary to register the connection information shown in FIG. 2 in advance in the user management information storage unit 121 of the user management server 120 in the present exemplary embodiment.

Figure 4:
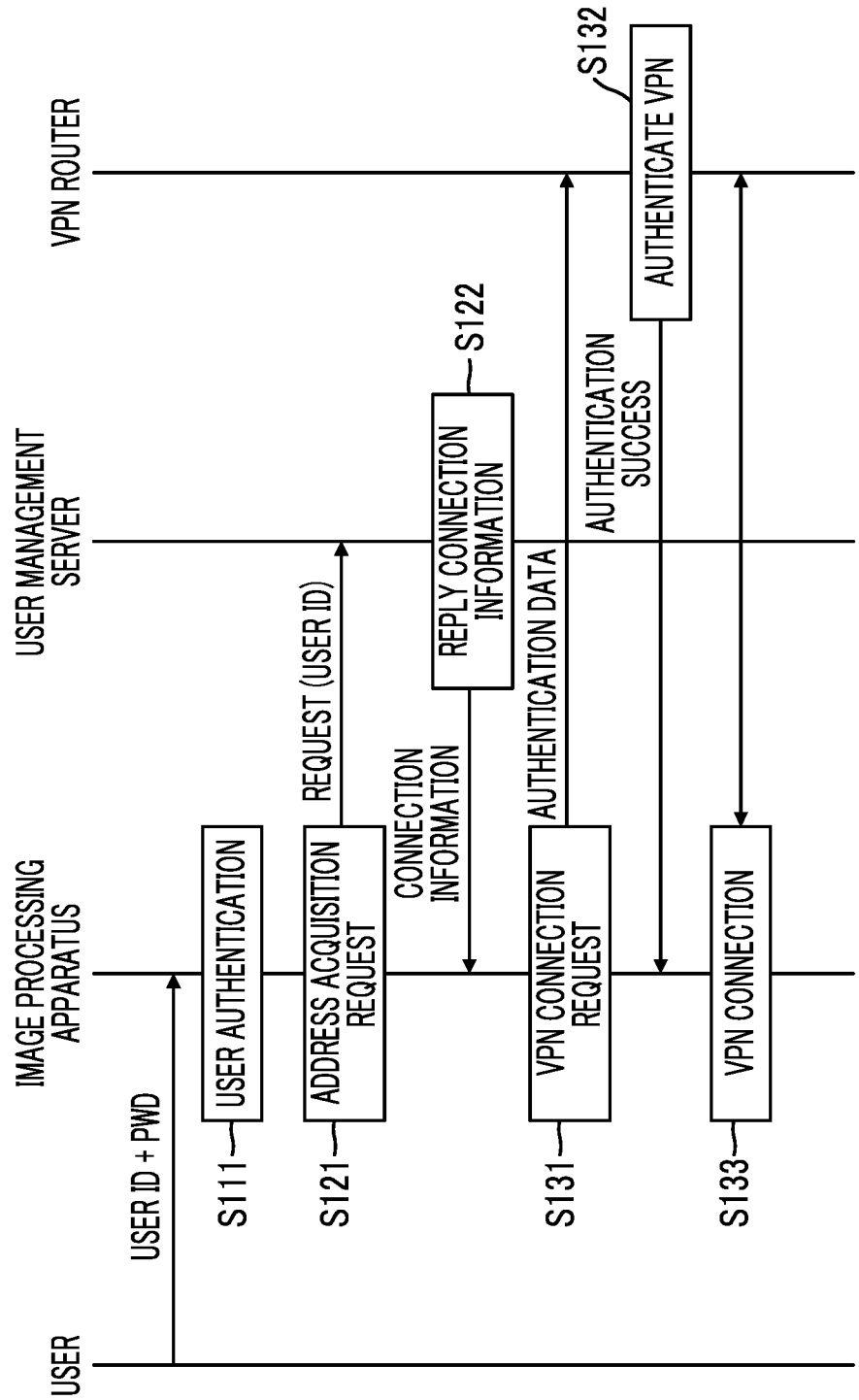
FIG. 4 is a sequence diagram showing pieces of processing performed at the time of VPN connection in the first exemplary embodiment.

In the present exemplary embodiment, the schematic pieces of processing of controlling the image processing in the image processing apparatus 110 by the control apparatus 220 (FIG. 3) and the pieces of processing performed after the VPN connection (FIG. 5) may be identical to the pieces of processing in the first exemplary embodiment. In the present exemplary embodiment, since the connection information is acquired from the user terminal 150 instead of the user management server 120, the pieces of processing performed at the time of the VPN connection are slightly different from the pieces of processing in the first exemplary embodiment. Hereinafter, the details of the pieces of processing performed at the time of the VPN connection in the present exemplary embodiment will be described with reference to a sequence diagram shown in FIG. 7. Pieces of processing identical to the pieces of processing in the first exemplary embodiment shown in FIG. 4 are designated by identical step numbers, and the description thereof will be omitted as appropriate.

In a case where the user in the coworking space wants to start using the image processing apparatus 110, the user brings the reader 140 close to a position at which the portable user terminal 150 and the reader 140 can communicate with each other. Alternatively, the user terminal 150 is brought close to the reader 140 to the position at which the user terminal and the reader can communicate with each other. A tap operation of selecting a predetermined application on a screen displayed on the user terminal 150 is performed. Thereafter, the user may hold the user terminal 150 over the reader 140. In a case where the user terminal 150 receives this user operation (step S123), the reader 140 scans the user ID, the password, and the connection information stored inside the user terminal 150 in cooperation with an application in response to the user operation. The information acquisition unit 113 acquires the user ID, the password, and the connection information from the user terminal 150 by causing the reader 140 to scan the information as described above.

The image processing apparatus 110 performs the user authentication by collating the set of the user ID and the password acquired from the user terminal 150 with the authentication information registered in the user management information (step S111). Here, the description will be continued on the assumption that the authentication has succeeded.

As in the first exemplary embodiment, in a case where the information acquisition unit 113 acquires the connection information from the user terminal 150, the VPN connection unit 112 transmits, to the VPN router 210 specified by the IP address included in the acquired connection information, the VPN connection request including the authentication data included in the connection information (step S131). Since the subsequent pieces of processing are identical to the pieces of processing of the first exemplary embodiment, the description thereof will be omitted.

In the first exemplary embodiment, the VPN connection can be performed even though the user does not carry the user terminal 150 that stores the connection information and does not prepare the data scanning unit on the coworking LAN system 100 side. In other words, according to the present exemplary embodiment, since the connection information is acquired from the portable user terminal 150 of the user, the connection information may not be retained and managed by the user management server 120 or the like on the coworking LAN system 100 side.

In the present exemplary embodiment, the connection information is provided on the user side of the coworking LAN system 100 instead of the coworking LAN system 100 side, and the connection information is acquired from the user side of the coworking LAN system 100. As an example, in a case where the user carries the user terminal 150, the user terminal 150 stores the connection information, and the reader 140 scans the connection information as described above. However, the present invention is not limited to this method. For example, in a case where the user does not carry the user terminal 150, the user may input the connection information by operating the user interface such as the operation panel of the image processing apparatus 110.

Third Exemplary Embodiment

Figure 8:
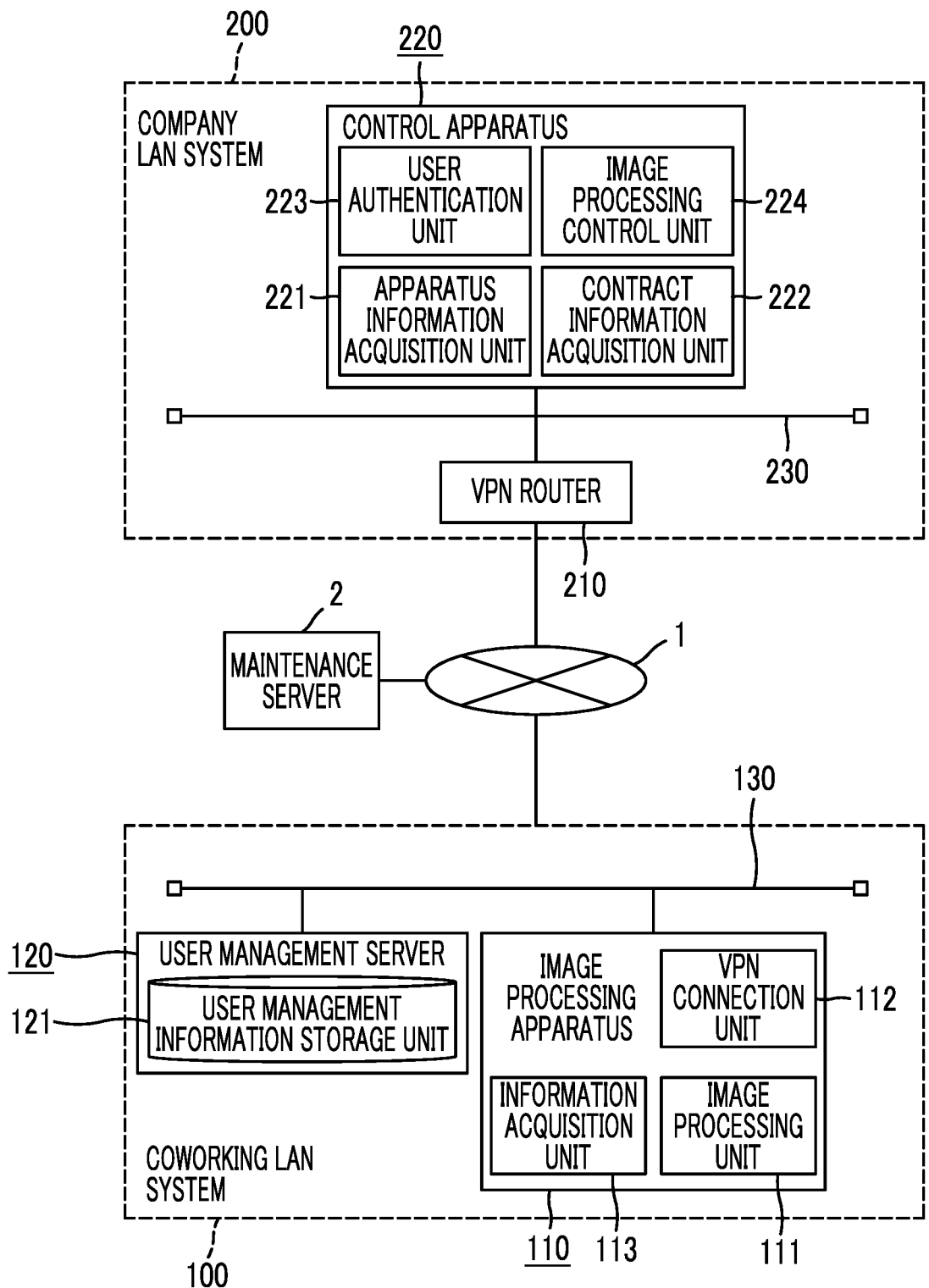
FIG. 8 is a block configuration diagram showing an image processing system according to a third exemplary embodiment.

FIG. 8 is a block configuration diagram showing an image processing system according to the present exemplary embodiment. Components identical to the components of the image processing system according to the first exemplary embodiment are designated by identical reference numerals, and the description thereof will be omitted. The image processing system according to the present exemplary embodiment has a configuration in which a maintenance server 2 is added to the image processing apparatus 110 shown in the first exemplary embodiment.

The maintenance server 2 is a server computer used for retaining and managing the contract information of the organization to which the user of the coworking space belongs according to the contract with the manager of the coworking space outside the coworking LAN system 100. The maintenance server 2 is connected to the network 1 so as to be accessible from the coworking LAN system 100 according to the contract.

That is, although the control apparatus 220 acquires the contract information from the image processing apparatus 110 via the VPN router 210, in the first exemplary embodiment, the user management server 120 retains the contract information, and the image processing apparatus 110 acquires the contract information from the user management server 120. The present exemplary embodiment is characterized in that the contract information is acquired from the maintenance server 2 instead of the user management server 120. Thus, the user management information in the present exemplary embodiment has a data configuration in which the contract information is excluded from the user management information shown in FIG. 2. The maintenance server 2 retains and manages the contract information in association with the organization ID of each organization.

In the present exemplary embodiment, the schematic pieces of processing of controlling the image processing in the image processing apparatus 110 by the control apparatus 220 (FIG. 3) may be identical to the pieces of processing in the first exemplary embodiment. Either the first exemplary embodiment or the second exemplary embodiment may be adopted as the processing of performing the VPN connection. Hereinafter, in the present exemplary embodiment, the pieces of processing performed at the time of the image processing control after the VPN connection will be described with reference to a sequence diagram shown in FIG. 9. Pieces of processing identical to the pieces of processing in the first exemplary embodiment shown in FIG. 5 are designated by identical step numbers, and the description thereof will be omitted as appropriate.

In the image processing apparatus 110, the information acquisition unit 113 transmits, to the user management server 120, an organization information acquisition request including the user ID that has succeeded in the authentication (step S141). The user management server 120 in the present exemplary embodiment reads out and replies the organization ID corresponding to the user ID included in the organization information acquisition request from the user management information in response to the transmitted organization information acquisition request (step S341).

Subsequently, the information acquisition unit 113 transmits, to the maintenance server 2, a contract information acquisition request including the acquired organization ID (step S342). The maintenance server 2 replies the contract information corresponding to the organization ID included in the contract information acquisition request in response to the transmitted contract information acquisition request (step S343). The information acquisition unit 113 acquires the contract information from the maintenance server 2 in this manner.

Subsequently, the information acquisition unit 113 transmits, to the user management server 120, the address acquisition request including the user ID that has succeeded in the authentication (step S344). The user management server 120 in the present exemplary embodiment reads out and replies the control apparatus address corresponding to the user ID included in the address acquisition request from the user management information in response to the transmitted address acquisition request (step S345). The subsequent pieces of processing may be identical to the pieces of processing of the first exemplary embodiment, and thus, the description thereof will be omitted.

According to the present exemplary embodiment, the contract information may be acquired from the maintenance server 2 that retains and manages the contract information without being retained in the coworking LAN system 100.

Although the processing of acquiring the organization ID from the user management server 120 and the processing of acquiring the control apparatus address are separated in the present exemplary embodiment, the processing may be performed such that the control apparatus address is acquired together with the organization ID with one acquisition request.

Fourth Exemplary Embodiment

An image processing system according to the present exemplary embodiment may have components identical to the components of the image processing system according to the third exemplary embodiment shown in FIG. 8. In the third exemplary embodiment, it is assumed that the maintenance server 2 is connected to the network 1 so as to be accessible from the coworking LAN system 100 according to the contract with the manager of the coworking space. On the other hand, the maintenance server 2 in the present exemplary embodiment retains and manages the contract information of the organization by the contract with the organization side. Accordingly, the maintenance server 2 is connected to the network 1 so as to be accessible from the company LAN system 200 according to the contract.

Figure 9:
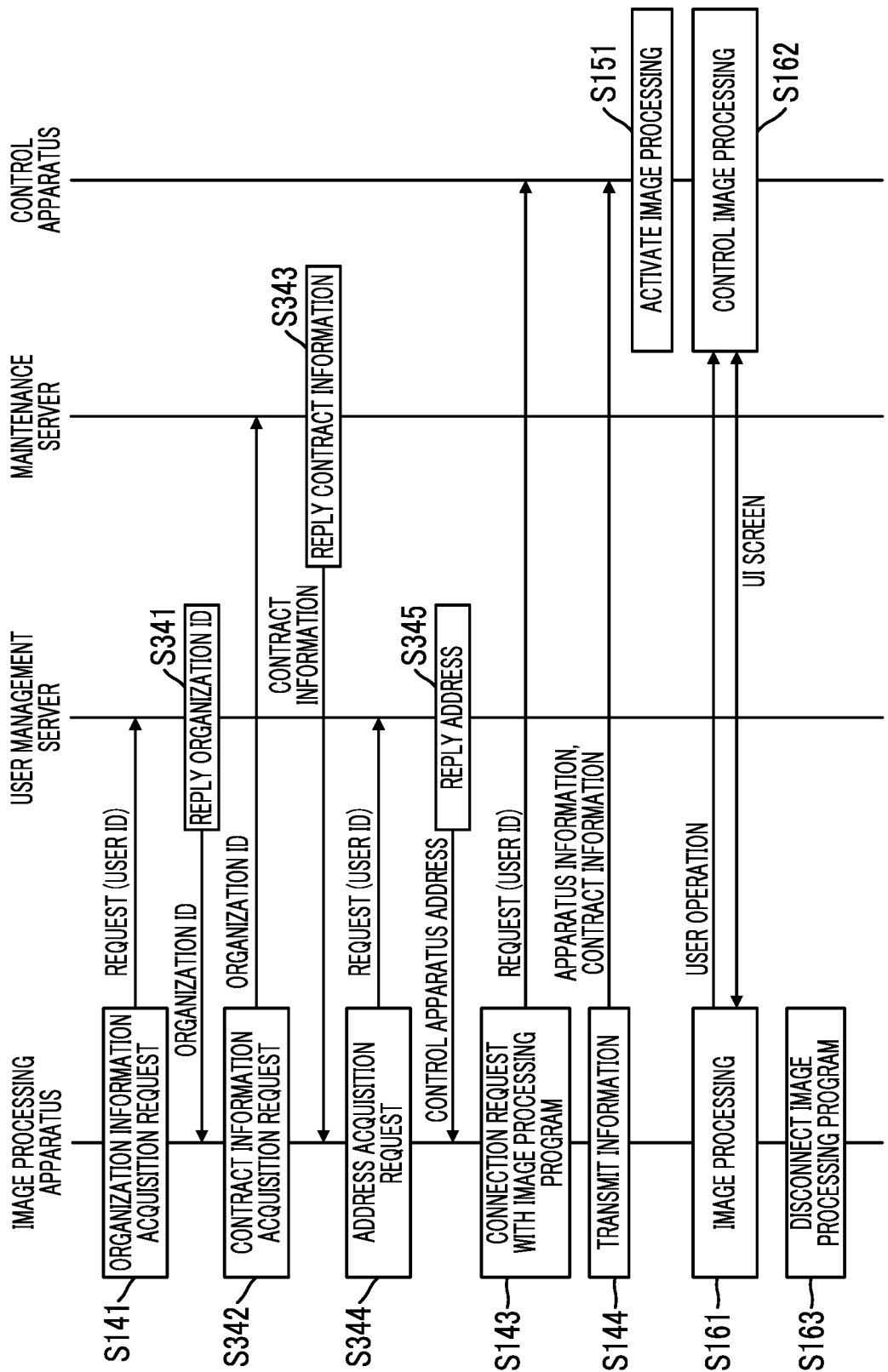
FIG. 9 is a sequence diagram showing pieces of processing performed at the time of VPN connection in the third exemplary embodiment.

In the present exemplary embodiment, the schematic pieces of processing of controlling the image processing in the image processing apparatus 110 by the control apparatus 220 (FIG. 3) may be identical to the pieces of processing in the first exemplary embodiment. Either the first exemplary embodiment or the second exemplary embodiment may be adopted as the processing of performing the VPN connection. Hereinafter, in the present exemplary embodiment, the pieces of processing performed at the time of the image processing control after the VPN connection will be described with reference to a sequence diagram shown in FIG. 10. Pieces of processing identical to the pieces of processing in the third exemplary embodiment shown in FIG. 9 are designated by identical step numbers, and the description thereof will be omitted as appropriate.

First, the information acquisition unit 113 of the image processing apparatus 10 in the present exemplary embodiment transmits, to the user management server 120, the address acquisition request including the user ID that has succeeded in the authentication (step S344). The user management server 120 in the present exemplary embodiment reads out and replies the control apparatus address corresponding to the user ID included in the address acquisition request from the user management information in response to the transmitted address acquisition request (step S345).

Subsequently, the image processing apparatus 110 transmits, to the control apparatus 220, the connection request with the image processing program including the user ID in order to perform the connection with the image processing program which is executed to receive the image processing control by the control apparatus 220 (step S143). The control apparatus 220 as the transmission destination can be specified by the control apparatus address acquired in step S345. Since the pieces of processing related to the connection with the image processing program have already been described in the first exemplary embodiment, the description here will be omitted.

Subsequently, the image processing apparatus 110 transmits, to the control apparatus 220, the apparatus information of the image processing apparatus retained therein (step S441).

Subsequently, the contract information acquisition unit 222 in the control apparatus 220 transmits, to the maintenance server 2, the contract information acquisition request including the organization ID of the organization (step S442). The maintenance server 2 replies the contract information corresponding to the organization ID included in the contract information acquisition request in response to the transmitted contract information acquisition request (step S343). In this manner, the contract information acquisition unit 222 acquires the contract information from the maintenance server 2.

In a case where the apparatus information and the contract information are acquired as described above, the image processing control unit 224 activates the image processing function specialized for the user who has logged in to the image processing apparatus 110 according to the apparatus information and the contract information (step S151). Thereafter, the image processing unit 111 performs the image processing in response to the user operation (step S161), but since the subsequent pieces of processing may be identical to the pieces of processing in the third exemplary embodiment, the description thereof will be omitted.

According to the present exemplary embodiment, the control apparatus 220 may acquire the contract information from the maintenance server 2 that retains and manages the contract information.

Fifth Exemplary Embodiment

Figure 11:
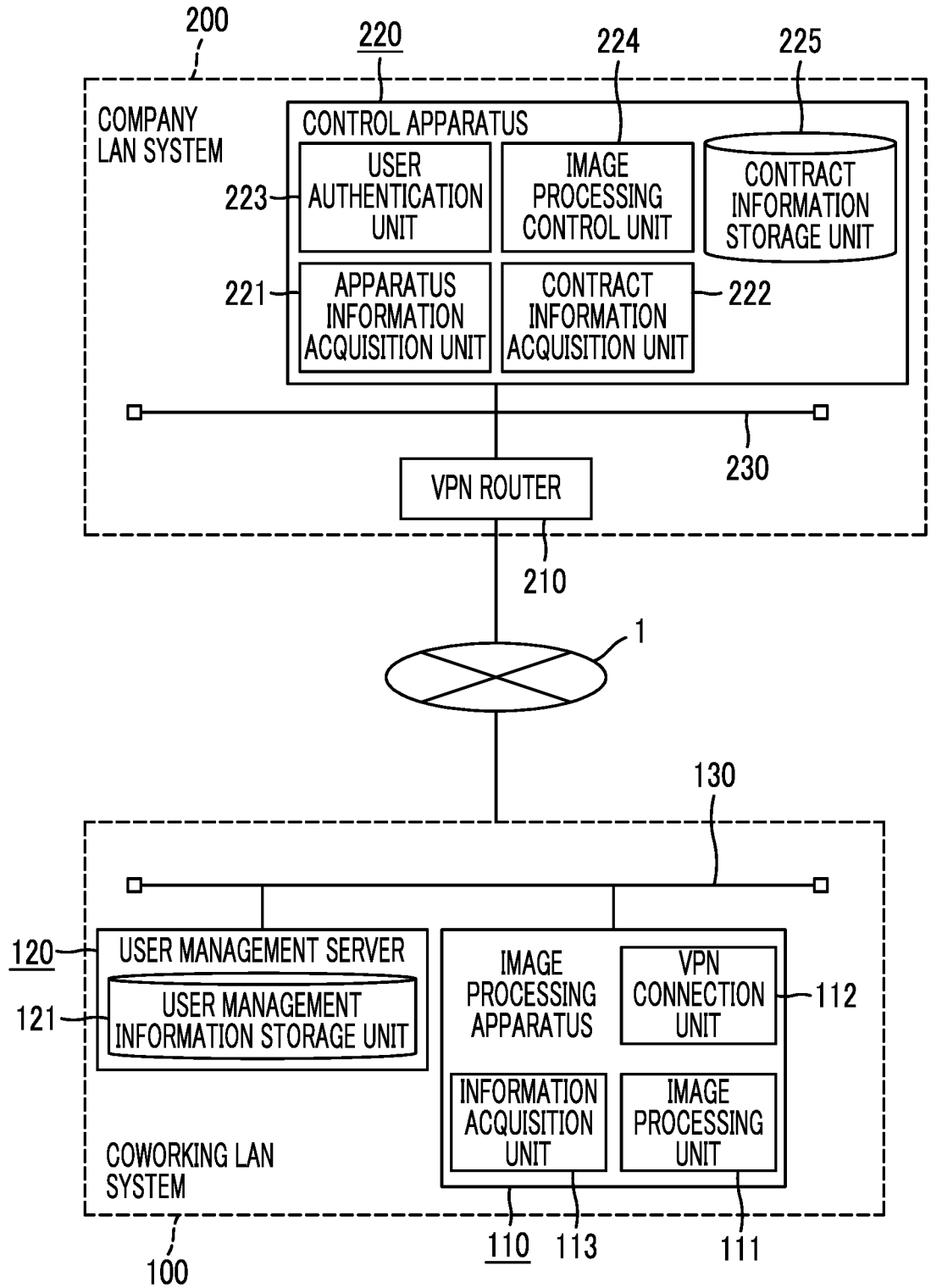
FIG. 11 is a block configuration diagram showing an image processing system according to a fifth exemplary embodiment.

FIG. 11 is a block configuration diagram showing an image processing system according to the present exemplary embodiment. Components identical to the components of the image processing system according to the first exemplary embodiment are designated by identical reference numerals, and the description thereof will be omitted. The image processing system according to the present exemplary embodiment has a configuration in which a contract information storage unit 225 is added to the control apparatus 220 shown in the first exemplary embodiment. The contract information storage unit 225 stores information regarding the contract of the company. That is, the contract information is retained in the user management server 120 in the coworking LAN system 100 in the first exemplary embodiment, and is retained in the maintenance server 2 in the third and fourth exemplary embodiments. The contract information acquisition unit 222 in the first to fourth exemplary embodiments acquires the contract information acquired by the image processing apparatus 110 from the image processing apparatus 110. On the other hand, the contract information acquisition unit 222 in the fifth exemplary embodiment operates and acquires the contract information spontaneously, instead of having the image processing apparatus 110 acquire the contract information. In the present exemplary embodiment, the contract information is provided inside the control apparatus 220 that uses the contract information, and is acquired by the contract information acquisition unit 222 by being read out from inside the control apparatus 220, that is, from the contract information storage unit 225.

Figure 10:
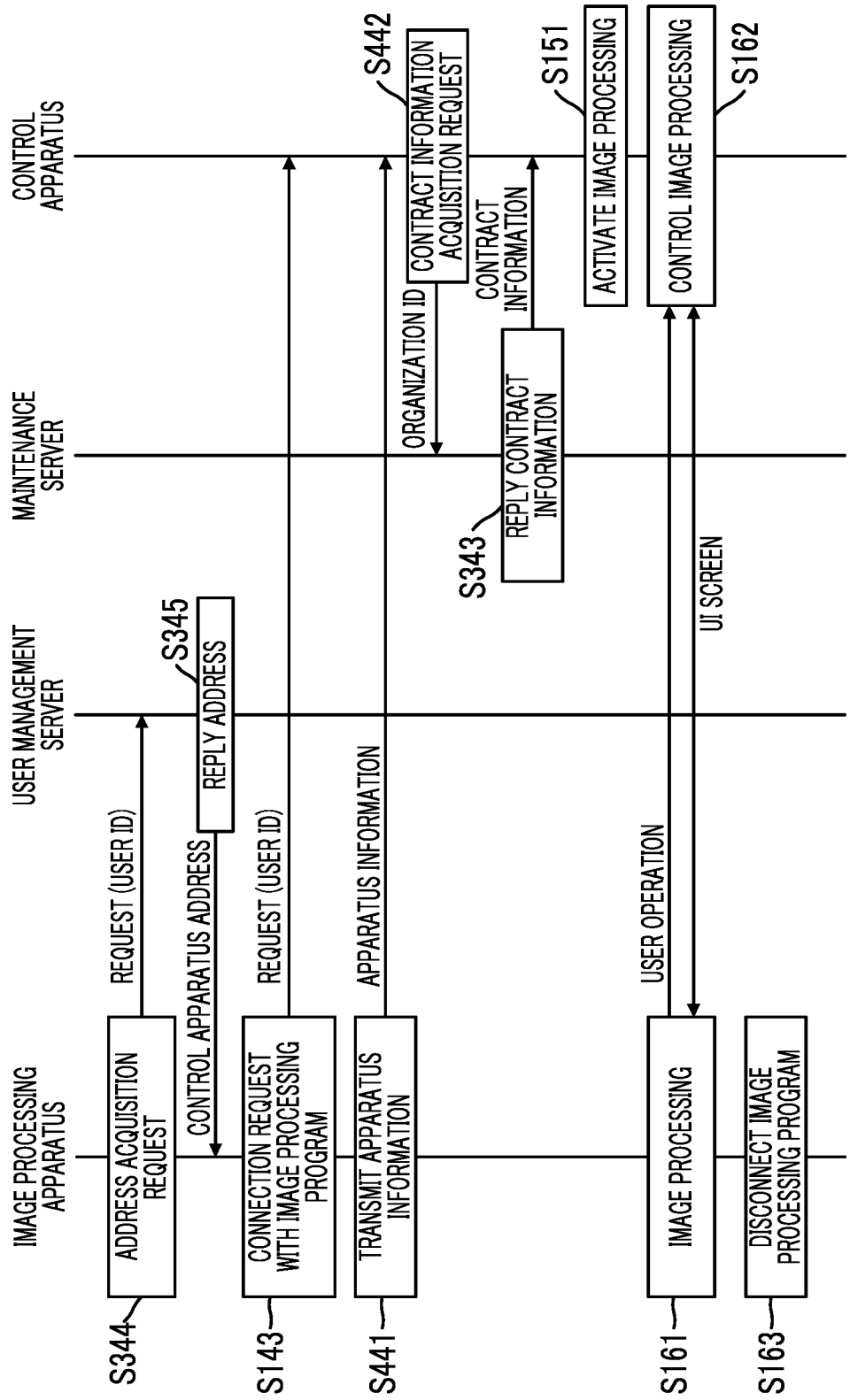
FIG. 10 is a sequence diagram showing pieces of processing performed at the time of VPN connection in a fourth exemplary embodiment.
Figure 12:
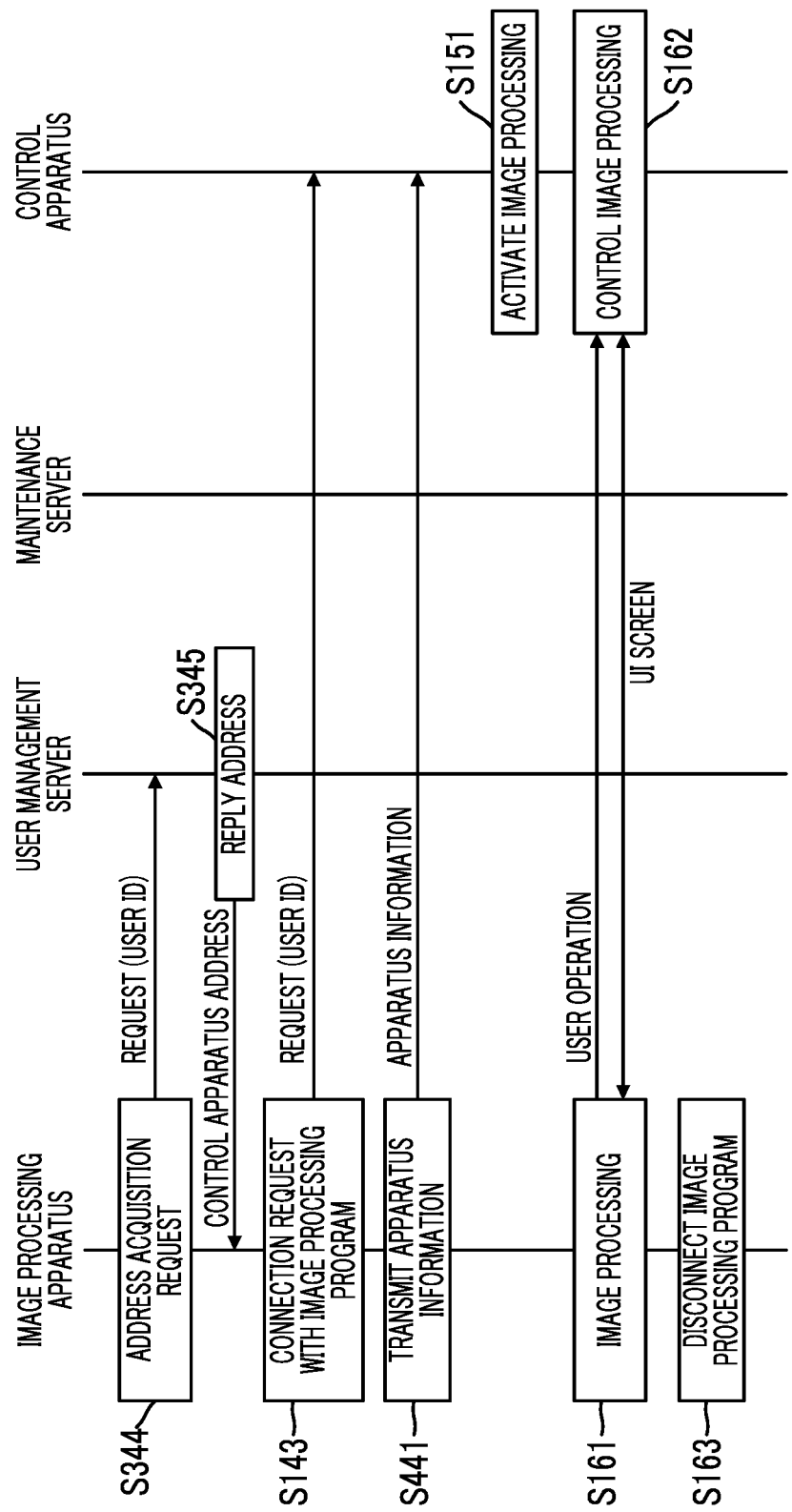
FIG. 12 is a sequence diagram showing pieces of processing performed at the time of VPN connection in the fifth exemplary embodiment.

FIG. 12 is a sequence diagram showing the pieces of processing performed at the time of the image processing control after the VPN connection in the present exemplary embodiment. Pieces of processing as the pieces of processing in the fourth exemplary embodiment shown in FIG. 10 are designated by identical step numbers, and the description thereof will be omitted as appropriate.

A flow of the pieces of processing in the present exemplary embodiment may be identical to the flow in the above-described fourth exemplary embodiment. However, in the present exemplary embodiment, the contract information is retained inside the control apparatus 220. Accordingly, the contract information acquisition unit 222 reads out and acquires the contract information from the contract information storage unit 225 inside the control apparatus 220 instead of the outside. Thus, the processing of acquiring the contract information by the contract information acquisition unit 222 is deleted in FIG. 12.

Sixth Exemplary Embodiment

Although the contract information is retained in the coworking LAN system 100, the maintenance server 2, or the control apparatus 220 in each of the above exemplary embodiments, the present exemplary embodiment is characterized in that the contract information is retained in the portable user terminal of the user who uses the image processing apparatus 110. Accordingly, the system configuration in the present exemplary embodiment may be identical to the system configuration in FIG. 6 including the user terminal 150, that is, the second exemplary embodiment.

Figure 7:
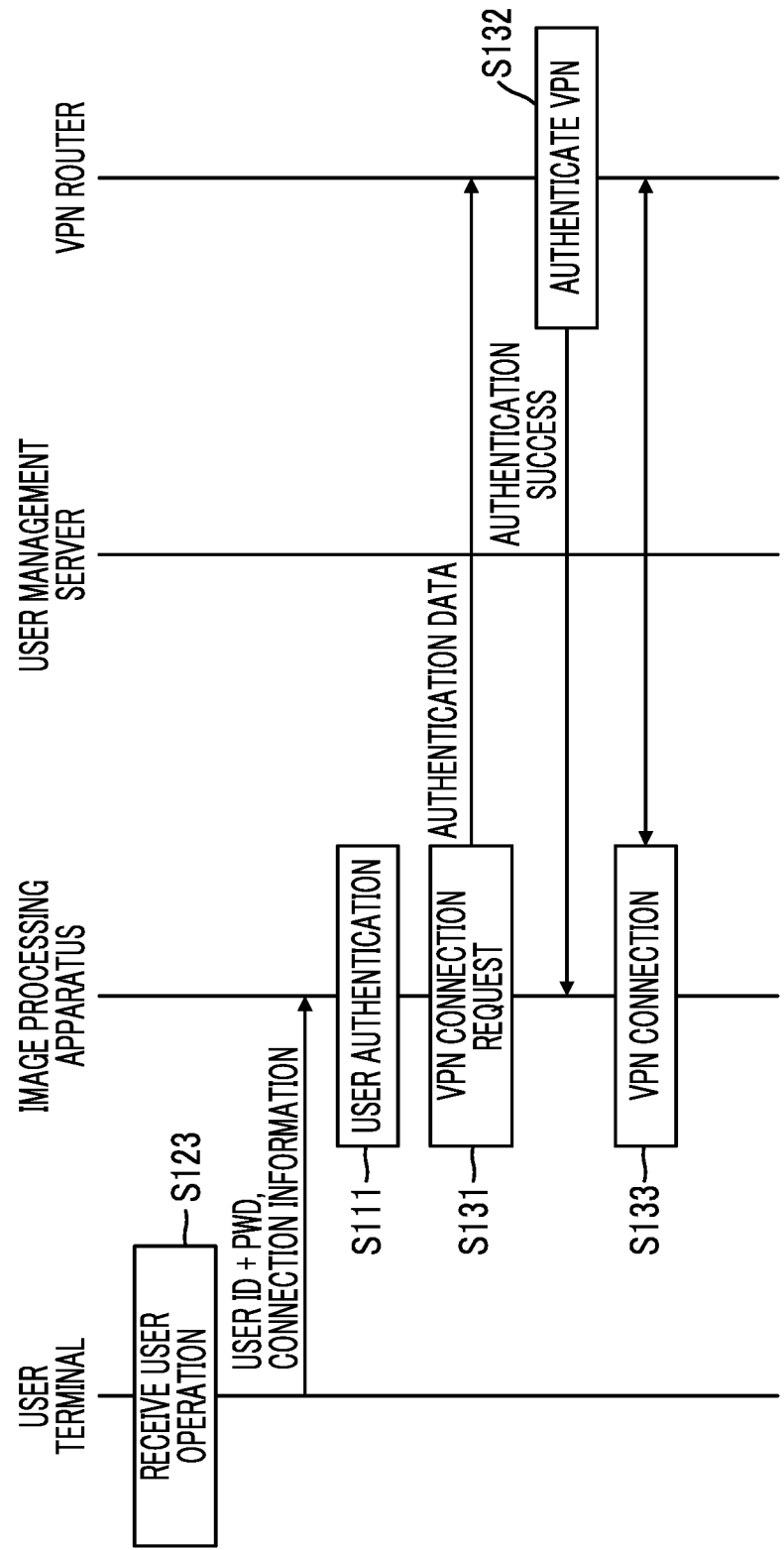
FIG. 7 is a sequence diagram showing pieces of processing performed at the time of VPN connection in the second exemplary embodiment.

The pieces of processing at the time of the VPN connection and the time of the image processing control in the present exemplary embodiment may be basically identical to the pieces of processing in the second exemplary embodiment. Although in FIG. 7 showing the pieces of processing at the time of the VPN connection, the image processing apparatus 110 scans and acquires the connection information from the user terminal 150 via the reader 140, in the present exemplary embodiment, the connection information is scanned and acquired together with the contract information from the user terminal 150. The control apparatus address may also be acquired. In this case, the user terminal 150 stores the connection information, the contract information, and the control apparatus address.

The present exemplary embodiment is characterized in that the contract information is acquired from the user side of the image processing apparatus 110. Accordingly, similarly to the connection information in the second exemplary embodiment, the contract information may not be acquired from the user terminal 150, and may be input by the user from the operation panel or the like of the image processing apparatus 110.

Figure 5:
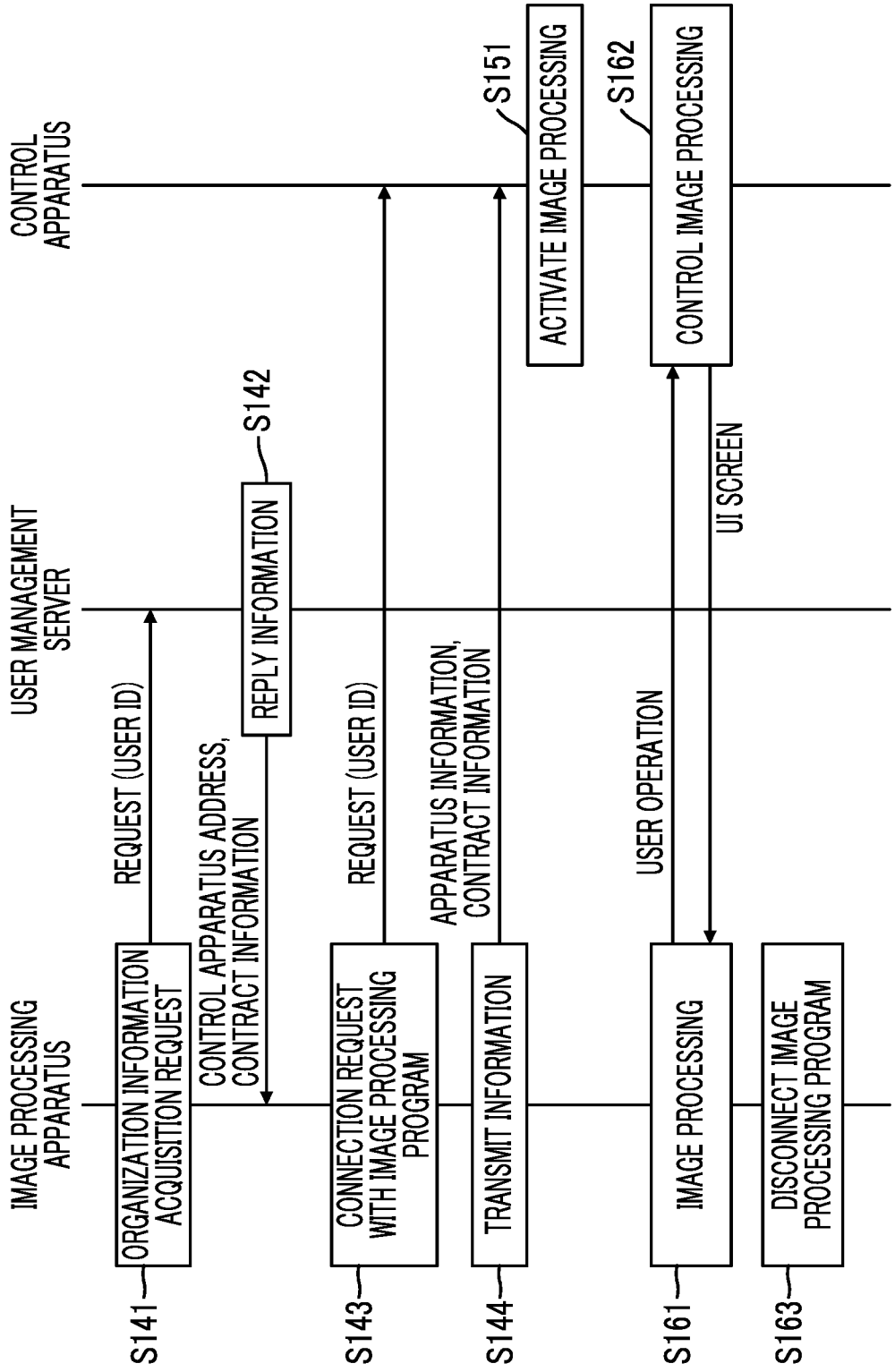
FIG. 5 is a sequence diagram showing pieces of processing performed at the time of the image processing control in the first exemplary embodiment.

In FIG. 5 showing the pieces of processing at the time of the image processing control, the image processing apparatus 110 acquires the control apparatus address and the contract information from the user management server 120 (steps S141 and S142). However, as described above, in the present exemplary embodiment, since the control apparatus address and the contract information are acquired from the user terminal 150, this processing can be omitted.

According to the present exemplary embodiment, with the aforementioned configuration, the configuration for acquiring the contract information, that is, the configuration of the image processing apparatus 110 may be simplified without providing the reader 140.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:
   a first processor that is mounted on an image processing apparatus installed in a shared space and shared by a plurality of users who do not belong to an identical organization; and
   a second processor that is mounted on a control apparatus installed together with a virtual private network (VPN) connection unit in a local area network outside the shared space, the control apparatus being used by an organization to which a part of the plurality of users belongs,
   wherein the first processor is configured to acquire address information of the VPN connection unit,
   the first processor is connected to the VPN connection unit by using the acquired address information, and
   the second processor is configured to:
      acquire apparatus information indicating an apparatus configuration of the image processing apparatus from the image processing apparatus via the VPN connection unit;
      acquire contract information regarding use of the image processing apparatus corresponding to the organization to which the user who uses the image processing apparatus belongs; and
      execute processing corresponding to the apparatus information and the contract information to control image processing performed by the first processor.

2. The image processing system according to claim 1, wherein the first processor is configured to:
   acquire the address information of the VPN connection unit from a user side of the image processing apparatus.

3. The image processing system according to claim 2, wherein the first processor is configured to:
   acquire the address information of the VPN connection unit by scanning the address information from a portable terminal of the user who uses the image processing apparatus by a data scanning unit connected to the image processing apparatus.

4. The image processing system according to claim 1, wherein the first processor is configured to:
   acquire the address information of the VPN connection unit from a management server that manages a user of the shared space.

5. The image processing system according to claim 1, wherein the second processor is configured to:
   acquire the contract information acquired by the first processor from the first processor via the VPN connection unit.

6. The image processing system according to claim 5, wherein the first processor is configured to:
   acquire the contract information from a management server that is used for managing a user of the shared space.

7. The image processing system according to claim 5, wherein the first processor is configured to:
   acquire the contract information from a server of a management company that manages the contract information, which is installed outside the shared space.

8. The image processing system according to claim 5, wherein the first processor is configured to:
   acquire the contract information from a user side of the image processing apparatus.

9. The image processing system according to claim 8, wherein the first processor is configured to:

acquire the contract information by scanning the contract information from a portable terminal of the user who uses the image processing apparatus by a data scanning unit connected to the image processing apparatus.

10. The image processing system according to claim 1, wherein the second processor is configured to:
   acquire the contract information spontaneously rather than from the first processor.

11. The image processing system according to claim 10, wherein the second processor is configured to:
   acquire the contract information by reading out the contract information from a storage unit included in the control apparatus.

12. The image processing system according to claim 10, wherein the second processor is configured to:
   acquire the contract information from a server of a management company that manages the contract information.

13. A non-transitory computer readable medium storing a program causing a computer to achieve a function, the computer being installed together with a virtual private network connection unit in a local area network outside a shared space in which an image processing apparatus shared by a plurality of users who do not belong to an identical organization is installed and being used by an organization to which a part of the plurality of users belongs, the function comprising:
   acquiring apparatus information indicating an apparatus configuration of the image processing apparatus from the image processing apparatus via the VPN connection unit;
   acquiring contract information regarding use of the image processing apparatus corresponding to the organization to which the user who uses the image processing apparatus belongs; and
   executing processing corresponding to the apparatus information and the contract information to control image processing performed by the image processing apparatus.

14. An image processing system comprising:
   a first processor that is mounted on an image processing apparatus installed in a shared space and shared by a plurality of users who do not belong to an identical organization; and
   a second processor that is mounted on a control apparatus installed together with virtual private network (VPN) connection means in a local area network outside the shared space, the control apparatus being used by an organization to which a part of the plurality of users belongs,
   wherein the first processor includes
   means for acquiring address information of the VPN connection unit,
   the first processor is connected to the VPN connection unit by using the acquired address information, and
   the second processor includes:
   means for acquiring apparatus information indicating an apparatus configuration of the image processing apparatus from the image processing apparatus via the VPN connection unit;
   means for acquiring contract information regarding use of the image processing apparatus corresponding to the organization to which the user who uses the image processing apparatus belongs; and
   means for executing processing corresponding to the apparatus information and the contract information to control image processing performed by the first processor.

* * * * *